(12) United States Patent
Schwarz

(10) Patent No.: US 11,214,187 B2
(45) Date of Patent: Jan. 4, 2022

(54) MOTORCYCLE TIE DOWN BRACKET

(71) Applicant: Magic Schwarz, Austin, TX (US)

(72) Inventor: Magic Schwarz, Austin, TX (US)

( * ) Notice: Subject to any disclaimer, the term of this patent is extended or adjusted under 35 U.S.C. 154(b) by 0 days.

(21) Appl. No.: 16/353,700

(22) Filed: Mar. 14, 2019

(65) Prior Publication Data

US 2019/0283653 A1 Sep. 19, 2019

Related U.S. Application Data

(60) Provisional application No. 62/642,775, filed on Mar. 14, 2018.

(51) Int. Cl.
*B60P 7/08* (2006.01)

(52) U.S. Cl.
CPC .................. *B60P 7/0823* (2013.01)

(58) Field of Classification Search
CPC ......... B60P 7/0823; B60P 7/0807; B60P 3/07; B60P 3/073; B60P 3/079; B62H 3/02
USPC ............................ 410/10–12, 21, 23, 97, 100
See application file for complete search history.

(56) References Cited

U.S. PATENT DOCUMENTS

| | | | |
|---|---|---|---|
| 4,842,458 A | 6/1989 | Carpenter | |
| 6,261,037 B1 * | 7/2001 | Richards | B65D 85/20 410/36 |
| 6,805,522 B2 | 10/2004 | Condon | |
| 7,185,904 B1 * | 3/2007 | Jones | B60R 9/06 |
| 7,850,407 B2 | 12/2010 | Burry et al. | |
| 8,172,492 B1 * | 5/2012 | Kelderman | B60P 3/079 410/3 |
| 9,586,512 B2 | 3/2017 | Hon | |
| 2003/0103831 A1 * | 6/2003 | Alderman | B60P 3/079 410/100 |
| 2004/0253073 A1 * | 12/2004 | Gohata | B60P 3/079 410/100 |

* cited by examiner

*Primary Examiner* — Stephen T Gordon
(74) *Attorney, Agent, or Firm* — Hall Estill Law Firm

(57) ABSTRACT

Method and apparatus for securing a motorcycle to a base surface for transport. In some embodiments, a tie down bracket has a central bar configured for attachment to a frame of the motorcycle at a medial location thereof, such as behind a gas tank and forward of a seat supporting area of the motorcycle. First and second attachment plates are attached to opposing proximal and distal ends of the central bar. Each of the first and second attachment plates is configured to receivingly engage at least a first strap for securement to the base surface and at least a second strap for securement to a handle bar portion of the motorcycle. In this way, the motorcycle is secured to the base surface near a center of gravity of the motorcycle and little or no compressive strain is placed on a front fork suspension of the motorcycle.

20 Claims, 4 Drawing Sheets

MOTORCYCLE TIE DOWN BRACKET

RELATED APPLICATION

The present application claims priority to U.S. Provisional Patent Application No. 62/642,775 filed Mar. 14, 2018, the contents of which are hereby incorporated by reference.

SUMMARY

Various embodiments of the present disclosure are generally directed to an apparatus and method for securing a motorcycle to a base surface, such as the floor of a trailer, for purposes of transporting the motorcycle to a desired destination.

In some embodiments, a securement system has a central bar with opposing proximal and distal ends. A medial portion of the central bar between the proximal and distal ends is configured for attachment to a frame of the motorcycle. A first attachment plate is attached to the proximal end of the central bar, and a second attachment plate is attached to the distal end of the central bar. Each of the first and second attachment plates is configured to receivingly engage at least a first strap for securement to the base surface and at least a second strap for securement to a handle bar portion of the motorcycle.

These and other features which characterize various embodiments of the present disclosure can be understood in view of the following detailed discussion and the accompanying drawings.

DETAILED DESCRIPTION

Figure 1:
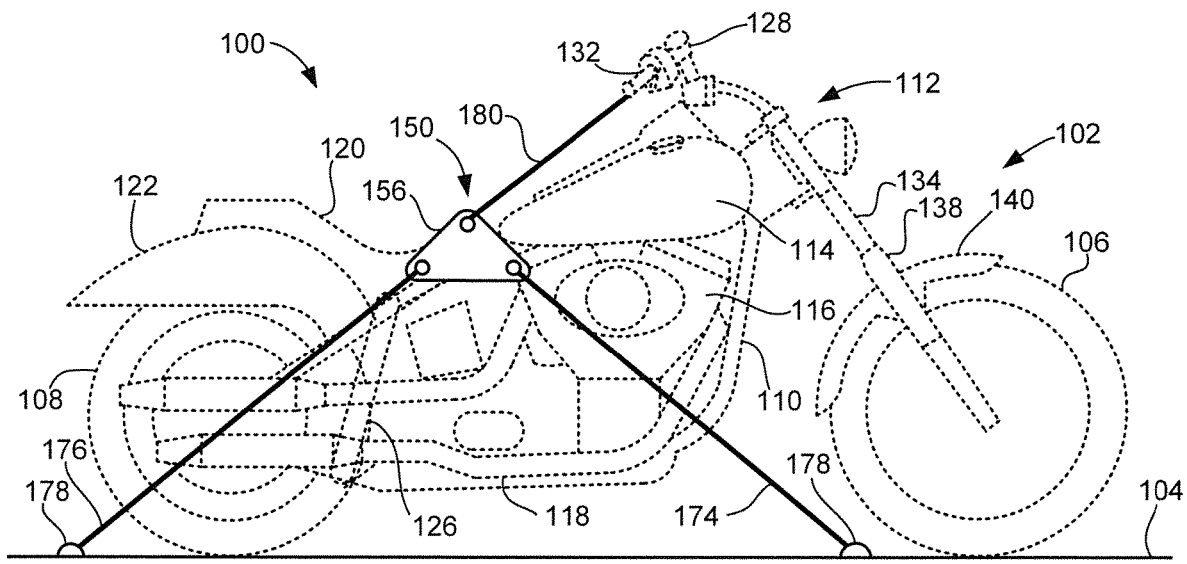
FIG. 1 is a side elevational representation of a motorcycle tie down system in an operative environment in which a motorcycle is secured to an underlying base surface in accordance with some embodiments.

Various embodiments of the present disclosure are generally directed to a system for securing a motorcycle to a base surface, such as the floor of a trailer used to transport the motorcycle to a desired destination.

It is common for motorcycle enthusiasts (sometimes referred to as "riders" or "bikers") to transport a motorcycle to a distant location, such as a motorcycle rally or other event, to enable the rider to display and/or ride the motorcycle during participation in the event. Transporting the motorcycle eliminates the need for the rider to drive the motorcycle all the way to the distant location. There are other reasons for a motorcycle owner to transport a motorcycle as well, such as to obtain servicing of the motorcycle at a dealership or repair shop, to deliver a motorcycle that has been sold to a new owner, etc.

When transporting a motorcycle in this manner, it is common to secure the motorcycle to a transport surface, such as the floor of a trailer that is towed behind a powered motor vehicle or to the bed of a pickup or flatbed truck. Such securement of the motorcycle may include the attachment of tie down straps to various attachment locations of the motorcycle to prevent the motorcycle from tipping over or otherwise becoming detached during transport. One problem that has been noted with existing motorcycle transport configurations is the stress that can be placed upon the suspension of a motorcycle during such transport.

As will be recognized, a typical motorcycle has a rigid frame configured to support various elements such as an engine, exhaust system, rear wheel, drive train, gas tank, rider seat, etc. A steering assembly extends from the front of the frame. The steering assembly has handle bars (also referred to as a handle bar portion) configured to be grasped by the hands of the rider to steer and activate the motorcycle (e.g., throttle, gear shift, etc.), and front struts (the "fork") that extend from the handle bars to support a front wheel.

Motorcycle designs often include a suspension to dampen shocks and vibrations encountered during riding. The suspension can include the aforementioned fork as a pair of retractable fork tubes for the front wheel, and one or more shock absorbers for the rear wheel. Other motorcycle suspension configurations can be used. These and other types of suspension elements can include mechanical dampers with internally sealed fluidic chambers, with compression and flow of the fluid providing the requisite mechanical damping. Coiled springs can be used as part of a motorcycle suspension in some cases.

It is generally necessary to supply sufficient tension in the tie down straps to secure the weight of the motorcycle and maintain the motorcycle in a nominally upright, non-movable position during transport. Existing tie down methodologies often use the steering assembly as one of the attachment points, so that tensioned straps are extended from the steering assembly down to opposing sides of the motorcycle.

The applied tension force can place significant stress upon the suspension as the fork tubes or other dampers are largely "bottomed out" or otherwise held in a rigid condition. Should the transport vehicle encounter significant vibrations and/or mechanical shocks during transport, the suspension may not be able to adequately absorb this mechanical input, resulting in damage that may not be discovered until the motorcycle reaches the intended destination (e.g., damaged seals, leaking suspension fluid, cracked or bent structural members, etc.).

Accordingly, various embodiments of the present disclosure are generally directed to an apparatus and method for securing a motorcycle to a transport surface. As explained below, a tie down bracket is configured to be attached to a medial portion of a motorcycle frame. The tie down bracket has a central bar that extends transversely to a longitudinal axis of the motorcycle along which the front and rear wheels are directed.

The central bar has opposing first and second ends. A medial portion of the central bar between the first and second ends is attachable to spaced apart first and second frame members. It is contemplated that the attachment location will be adjacent a rear portion of a gas tank of the motorcycle. In some cases, a cushioned seat portion of the motorcycle may be removed from the motorcycle to provide access to the frame members.

The bracket further includes a pair of opposing end plates. Each end plate is attached to a different end of the central bar. It is contemplated albeit not necessarily required that the central bar will have sufficient length to extend beyond a width of the motorcycle at this location to provide clearance for the end plates.

Each end plate is configured to receive multiple tie down straps (also referred to herein as "attachment straps"). The attachment straps can be routed as required to secure the motorcycle to the transport surface. In some embodiments, a lower portion of each end plate receives two attachment straps to provide fore and aft securement along the side of the motorcycle. An upper portion of each end plate further receives a third, shortened attachment strap for securement to a selected side of the handle bars of the steering assembly.

The bracket can be coated with a protective layer such as an overcoat of elastomeric material to reduce the possibility of marring or damaging a finished surface of the motorcycle during installation and removal. The various attachment straps may be provided with a soft outer cover, such as neoprene or other tough and non-marring material to protect against damage.

The system attaches to the motorcycle in a region near a center of gravity of the motorcycle and near the location at which the rider sits during riding. This places little or no compressive stress upon the motorcycle suspension during transport, particularly with regard to the front suspension fork tubes. Because the respective handle bars are secured to the bracket, there is no need for a front chock type assembly to separately support a lower portion of the front wheel to reduce inadvertent turning of the front wheel relative to the frame.

Figure 2:
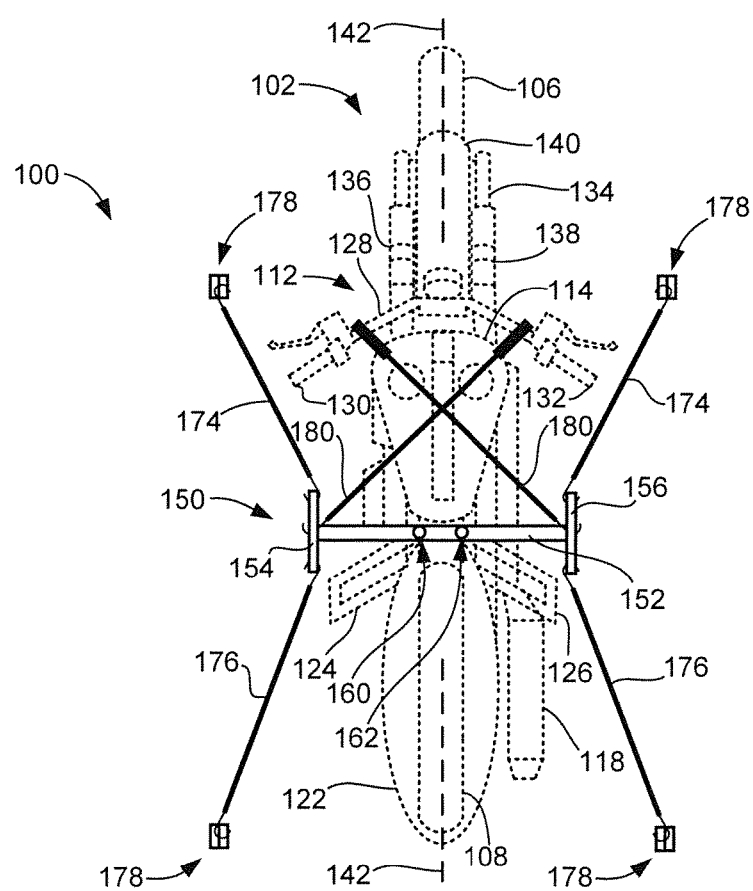
FIG. 2 is a top plan view of FIG. 1.

These and other features and advantages of various embodiments can be understood beginning with a review of FIGS. 1 and 2, which collectively illustrate a motorcycle tie down system 100. The system 100 is used to attach a motorcycle 102 to an underlying base surface 104. It will be appreciated that the system 100 can be adapted for use with any number of different types and styles of motorcycles, as well as other types of vehicles and equipment as desired.

FIG. 1 provides a side-elevational view and FIG. 2 shows a top plan view of the system 100 and motorcycle 102. It is contemplated that the base surface 104 is a floor surface of a trailer that can be towed behind a powered motor vehicle (e.g., a truck, etc.), although other transport configurations may be used.

Before describing the system 100 in detail, it will be helpful to first identify various elements of the motorcycle 102. The motorcycle has been depicted in a broken-line and simplified fashion for purposes of clarity. As with most motorcycles, the motorcycle 102 includes front and rear wheels 106, 108, a tubular frame 110 and a steering assembly 112.

The frame 110 supports various elements of interest such as a fuel (gas) tank 114, engine 116, exhaust system 118, rider seat 120, rear fender 122, and optional side extending crash guards 124, 126. While not separately identifiable in the drawing, it will be appreciated that a rear suspension is also included to provide mechanical dampening of the rear wheel 108 with respect to the frame 110, such as one or more shock absorbers, springs or other damping elements.

The steering assembly 112 is configured for angular rotation with respect to the frame 110 to effect steering of the motorcycle during operation. The steering assembly 112 includes a pair of handle bars 128 with left and right user grips 130, 132. A fork assembly 134 is coupled to the handle bars 128 and supports the front wheel 106. Included in the fork assembly 134 is a front suspension with a pair of fork tubes, or struts 136, 138 adapted to telescopically dampen vibrations and mechanical shocks supplied to the front wheel 106. A front fender 140 covers upper portions of the front wheel 106 as shown. The motorcycle 102 is aligned along a longitudinal axis 142 (FIG. 2) with which the front and rear wheels 106, 108 are aligned when the motorcycle is secured.

The attachment system 100 includes a tie down bracket 150 which is configured for attached to a medial portion of the motorcycle 102. As further shown in FIGS. 3 through 5, the tie down bracket 150 includes an elongated central bar 152 with opposing end plates 154, 156. The end plates are attached to respective first and second ends of the bar 152. While any suitably strong material may be used, it is contemplated that the central bar 152 and the end plates 154, 156 will be formed of plate metal, with the end plates welded to the opposing ends of the central bar.

The central bar 152 can be solid or tubular metal and has sufficient length to place the respective end plates 154, 156 beyond the outermost width extents of the motorcycle 102, as depicted in FIG. 2. The length of the central bar 152 can vary as required; in one embodiment, the central bar is about three feet (e.g., about 36 inches) or more in length. While a straight (linear) configuration is shown, the central bar 152 can take other shapes such as segmented, curvilinear, contoured, etc. to better accommodate a given motorcycle configuration. It will be noted that the straight central bar 152 is nominally orthogonal to the longitudinal axis 142 of the motorcycle 102.

Figure 3:
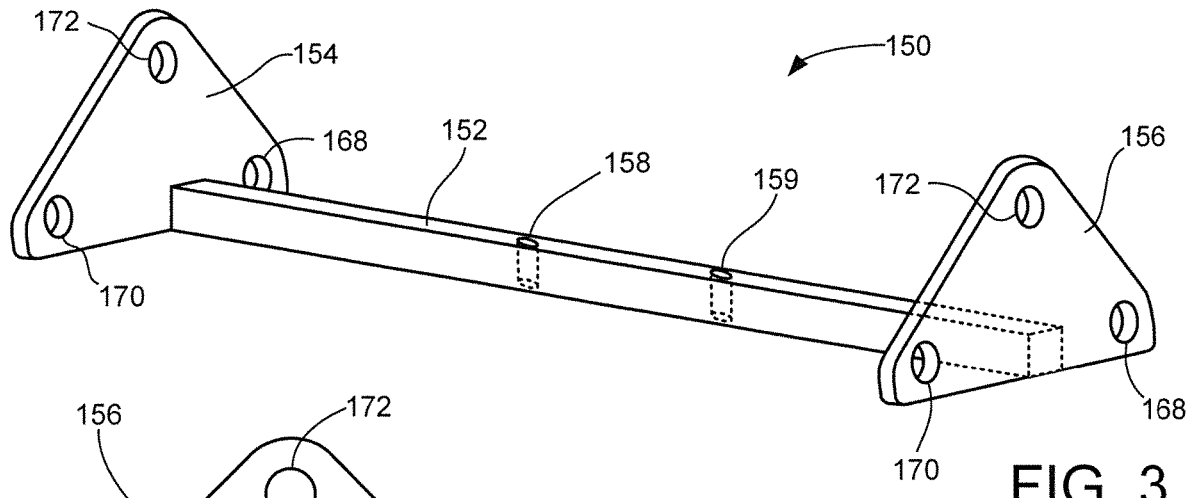
FIG. 3 is an isometric representation of a tie down bracket of the system of FIGS. 1-2 in some embodiments.

Continuing with FIG. 3, a medial portion of the central bar 152 includes a pair of spaced apart apertures 158, 159. These apertures accommodate a pair of threaded fasteners 160, 162 used to secure the central bar 152 to respective, spaced-apart frame members 164, 166 of the motorcycle frame 110 (best viewed in FIG. 5). The frame members 164, 166 may have pre-existing threaded apertures 164A, 166A that can be used to accommodate the fasteners 160, 162. This provides a secure attachment of the bracket 150 to a center (medial) portion of the motorcycle, low and near the center of gravity of the motorcycle. It is contemplated albeit not necessarily required that this attachment location can be directly behind the gas tank 114 and at a front portion of a seat supporting area of the frame, so that the mounting location is also near a center of gravity of the rider during operation.

Existing threaded holes in the frame members 164, 166 that are used to mount other features to the frame 110, such as the seat 120 or the crash guards 124 and 126, can be used to attach the central bar 152. In some cases, it may be necessary to remove the seat 120 to provide access to the frame members 164, 166. If so, the seat can be safely stowed elsewhere during transport, such as in the cab of the towing vehicle. Other attachment arrangements can be used, as discussed below.

Figure 4:
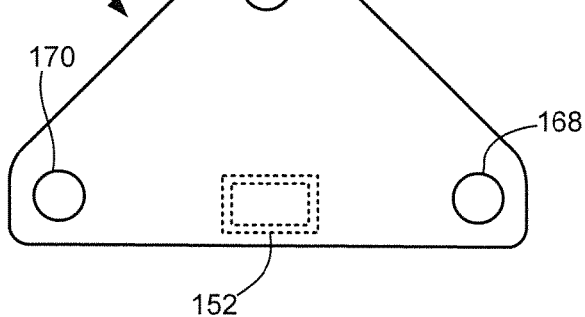
FIG. 4 shows an end plate of the tie down bracket of FIG. 3.
Figure 5:
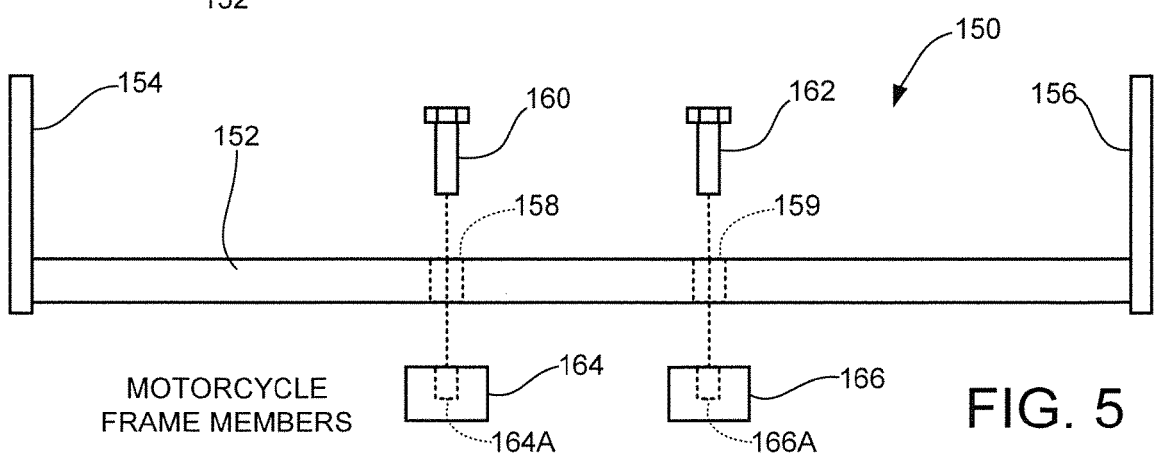
FIG. 5 is a side elevational representation of the tie down bracket.

As best shown in FIGS. 3-4, each of the end plates 154, 156 are substantially triangularly shaped and are provided with three corner areas having spaced apart apertures 168, 170 and 172. Other numbers and arrangements of apertures can be provided. The lower apertures 168 and 170 facilitate the respective attachment of lower fore and aft tie down straps 174, 176 along each side of the motorcycle 102 (see FIG. 1). The tie down straps 174, 176 can be provided with hooks or other attachment members configured to engage the apertures 168, 170 and corresponding attachment points 178 on the base surface 104 (see FIG. 2).

The upper aperture 172 in each plate 154, 156 enables the attachment of a pair of handle bar retention straps 180 which extend to secure the handle bars 128 (see FIG. 2) in a desired angular position. While the handle bar retention straps 180 are shown crossed in FIG. 2, in another embodiment each of the straps 180 can be directed in a forward direction to attach to the same side of the handle bars 128 as the corresponding end plate 154, 156. In either case, the straps 180 pull back on the handle bars 128 without applying significant downwardly directed loading or compression to the front suspension struts 136, 138. Similarly, the downwardly directed force from the system 100 is applied to the middle of the motorcycle at a location adjacent to the center of gravity of the motorcycle and the rider, so that limited loading is similarly applied to the rear suspension adjacent the rear wheel 108.

Figure 6:
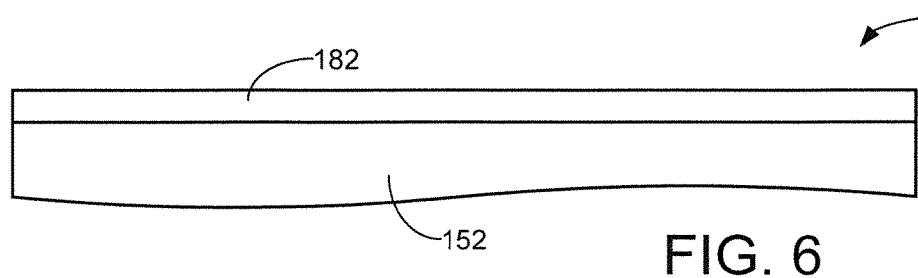
FIG. 6 represents the tie down bracket with the application of an elastomeric overcoat layer in some embodiments.

In some embodiments, the bracket 150 is provided with an elastomeric overcoat layer 182, as generally depicted in FIG. 6. The overcoat layer can be a suitable rubber or other elastomer that protects against damage to the motorcycle during installation and removal of the bracket 150. The overcoat layer can be applied using any suitable process including dip coating, spraying, etc.

Figure 7A:
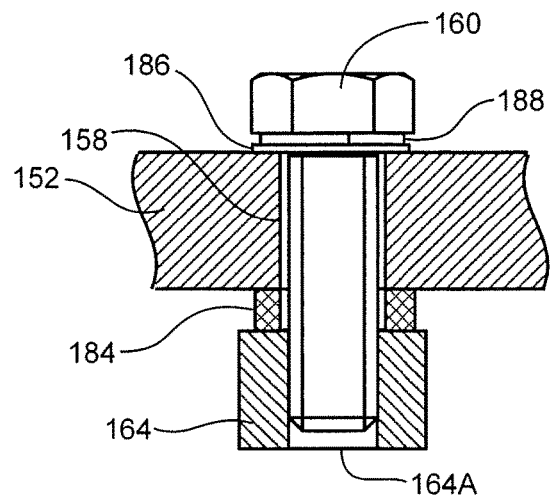
FIG. 7A is a cross-sectional representation of an attachment of the tie down bracket to a frame member of the motorcycle in accordance with some embodiments.
Figure 7B:
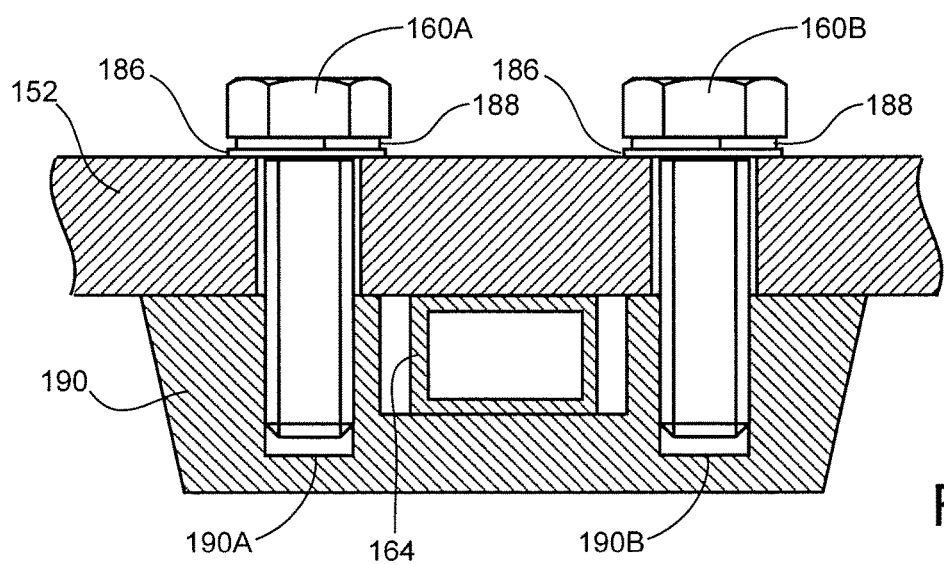
FIG. 7B is a cross-sectional representation of an attachment of the tie down bracket to a frame member of the motorcycle in accordance with other embodiments.

FIGS. 7A and 7B show different mounting arrangements that can be used to attach the central bar 152 to the respective frame members (in this case, fastener 160 and motorcycle frame member 164). It will be appreciated that any number of other attachment configurations can be used, so that FIGS. 7A and 7B are merely exemplary and are not limiting.

In FIG. 7A, a spacer (bushing) 184 is sandwiched between the central bar 152 and the frame member 164. A regular flat washer 186 and locking split washer 188 are provided under the head portion of the fastener 160. It is contemplated that the frame member 164 may include an internally threaded insert that can be engaged by threads of the fastener 160. In this way, the threaded fasteners 160, 162 (FIG. 5) are directly threaded into the respective frame members 164, 166 in FIG. 7A.

In FIG. 7B, a pair of fasteners 160A, 160B extend through the central bar 152 on opposing sides of the frame member 164. The fasteners engage a backing plate 190 that extends across and contactingly engages the respective lower surfaces of the frame member 164 and the central bar 152. The backing plate 190 may have internally threaded apertures 190A, 19B to threadingly receive fasteners 160A, 160B.

In this way, the mounting system of FIG. 7B engages the frame member 164 using a clam-shell arrangement as the frame member 164 is compressed between the bar 152 and the backing member 190. This arrangement is useful in applications where there are no existing apertures in the desired location for the central bar, and so the bar can be mounted without the need to add such holes to the frame. As before, bushings, spacers, compliant layers, etc. can be used as required.

Figure 8A:
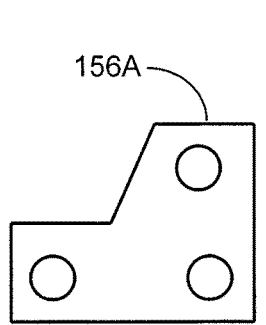
FIGS. 8A, 8B and 8C illustrate alternative configurations for the end plate of FIG. 4 in further embodiments.
Figure 8B:
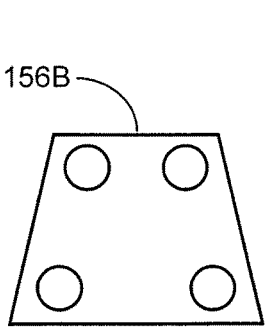
Figure 8C:
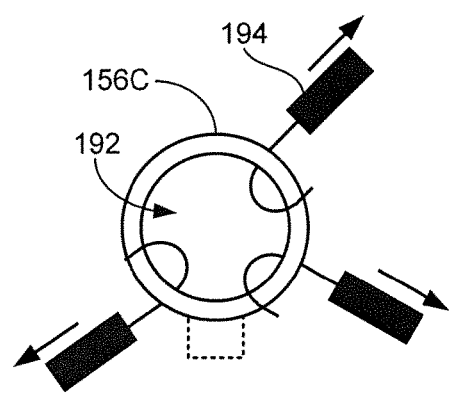

FIGS. 8A through 8C show alternative end plate configurations 156A, 156B and 156C. Other configurations can be used, so these are merely exemplary and not limiting. The end plate 156A in FIG. 8A is substantially L-shaped. The end plate 156E in FIG. 8B is substantially trapezoid-shaped, and includes four (4) apertures rather than three (3) apertures as discussed above. The end plate 156C in FIG. 8C comprises a ring shaped plate with a single central aperture 192. This allows any number of straps 194 to be attached at suitable attachment angles. While it is contemplated that each of the respective end plates 154, 156 on the opposing ends of the central bar 152 will be identical, this is not required in that the respective plates can have different configurations.

Figure 9:
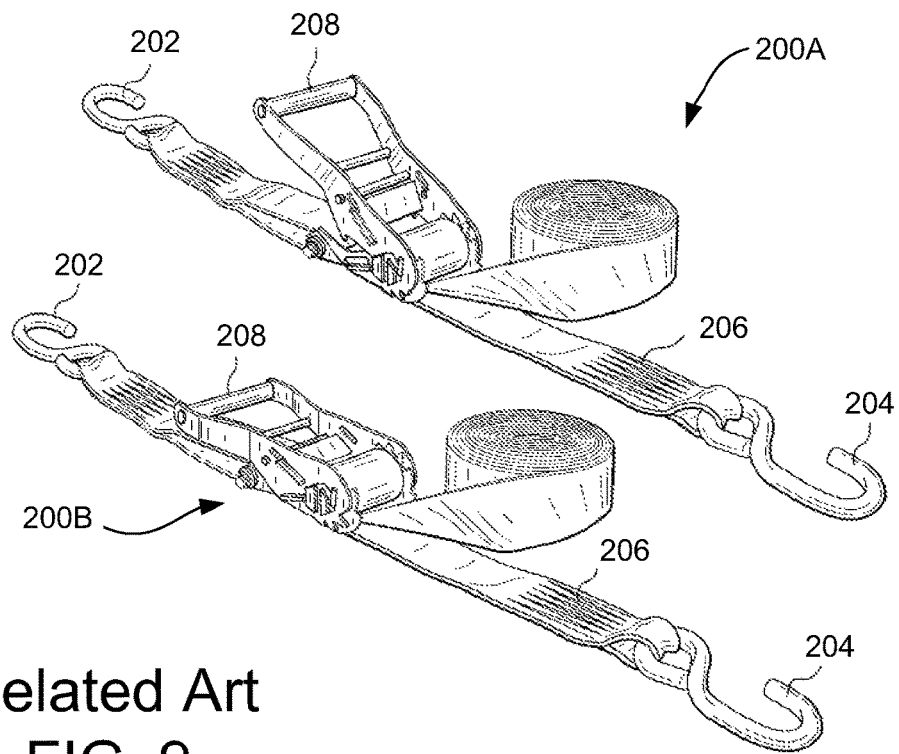
FIG. 9 illustrates tie down straps of the related art that can be advantageously used with the tie down bracket.

The tie down straps used with the bracket 150 can take any suitable form sufficient to secure the motorcycle 102. FIG. 9 depicts a pair of straps 200A, 200B of the related art that are particularly suitable at least for use as straps 174, 176 in FIGS. 1-2.

The straps 200A, 200B each include opposing hooks 202, 204 and a central web of flat reinforced fabric 206. A ratchet mechanism 208 is used to increase tension in the associated web 206 once the respective hooks 202, 204 are in place. For reference, the ratchet mechanism 208 is in an active position in strap 200A and in a locked position in strap 200B. Other forms of attachment straps can be used including cables, ropes, lines, wires, chains, bungee cords, etc.

In some cases, heavy duty straps such as 200A, 200B capable of providing a higher tension force are used as the lower tie down straps (e.g., 174, 176), and lower duty straps (such as elastomeric cables, etc.) that provide a lower tension force can be used as the handle bar tie down straps (e.g., 180). This is because the lower tie down straps maintain the motorcycle in an upright, secured position while the handle bar tie down straps primarily serve to prevent the front wheel from turning.

Figure 10:
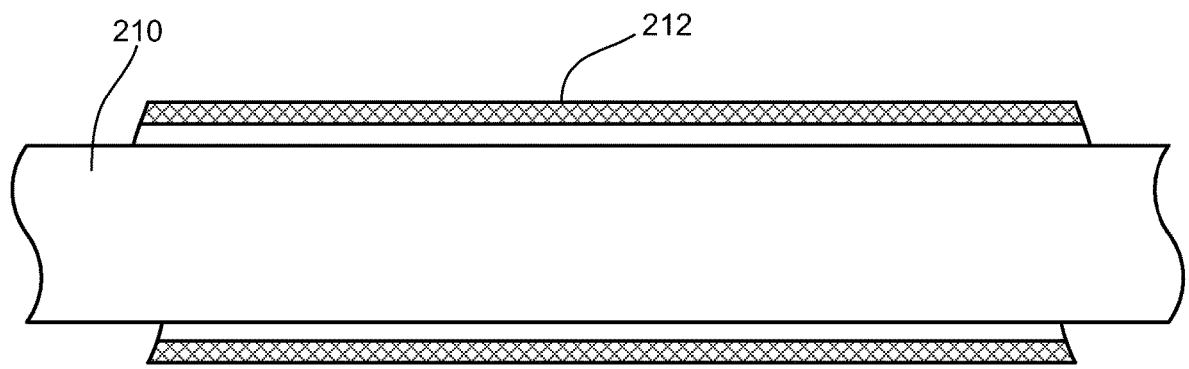
FIG. 10 shows a protective sleeve that can be provisioned over tie down straps such as represented in FIG. 9 in some embodiments.

FIG. 10 shows a medial portion of another strap 210 that can be used with the bracket 150. The strap 210 is surrounded by a protective cover 212 that extends along a significant portion of, or the entirety of, the extent of the strap 210. The protective cover can be formed of a suitable protective and cushioning material, such as neoprene or other conformal material. The cover 212 reduces a likelihood that damage will be incurred to the motorcycle finish as a result of the installation and removal of the securement system 100. A particularly suitable use of the cover 212 is for the handle bar attachment straps 180, although the cover material can also be adapted to cover the other straps 174, 176 as well. Configuring the cover with hook and loop fasteners or other features can enable metal aspects of a strap, such as the ratchet mechanisms 208 in FIG. 9, to be easily covered.

It will now be appreciated that the various embodiments provide a number of advantages over the existing art. The system is easily and efficiently mounted to a medial location of the motorcycle at a location near the motorcycle and rider respective centers of gravity. The central bar can be mounted to the frame using existing apertures, or non-penetrative attachments can be used. The end plates provide convenient locations to attach the various attachment straps, including to the base surface as well as to secure the handle bars of the motorcycle. Little or no preloading is applied to the motorcycle suspension, enabling the motorcycle suspension to react as intended should vibrations and shocks be encountered during transport. Because the angular orientation of the front wheel is secured, there is further no need to use separate chock supports to support the front wheel.

While it is contemplated that the securement system 100 will secure the motorcycle 102 in an upright (e.g., vertical) position with the front and rear tires 106, 108 in axial alignment (e.g., "straight ahead") along the longitudinal axis 142 as depicted in FIGS. 1-2, it can be seen that depending on the configuration of the straps, substantially any angular position can be achieved and maintained safely for the motorcycle by the system, including orienting the handle bars to a selected side, engaging a kick stand, etc.

The various embodiments are particularly suited to motorcycles with only two wheels, since the bracket stabilizes the motorcycle in an upright, vertical and axially aligned position. However, the bracket can be used for other types of motorcycles, including motorcycles with three wheels. In such cases, whether the motorcycle has two wheels in the front or two wheels in the back, the bracket can still safely secure a medial portion of the motorcycle to a base surface and impede turning of the front wheel(s) without placing undue stress upon the front or rear suspension. Moreover, the bracket can also be used with all-terrain vehicle (ATV) style vehicles with four or more wheels, as well as with other forms of vehicles such as snowmobiles, etc. that have a general motorcycle configuration. For clarity, these and similar types of open motor vehicles will be, for purposes of this disclosure, encompassed within the broad term "motorcycles."

It is to be understood that even though numerous characteristics and advantages of various embodiments of the present disclosure have been set forth in the foregoing description, together with details of the structure and function of various embodiments thereof, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus for securing, to a base surface, a motorcycle having a frame and a handle bar portion, the apparatus comprising:
   a central bar having opposing proximal and distal ends and a medial portion between the proximal and distal ends configured for attachment to the frame at a medial location of the motorcycle;
   a first attachment plate attached to the proximal end of the central bar; and
   a second attachment plate attached to the distal end of the central bar, each of the first and second attachment plates configured to receivingly engage at least a first strap for securement to the base surface and at least a second strap for securement to the handle bar portion of the motorcycle, wherein each of the first and second attachment plates are substantially triangularly shaped with first, second and third corner areas, a first aperture adjacent the first corner area, a second aperture adjacent the second corner area and a third aperture adjacent the third corner area, the first and second apertures of each of the first and second attachment plates configured to accommodate an interconnection of straps to the base surface, the third aperture of each of the first and second attachment plates configured to accommodate an interconnection to the handle bar portion of the motorcycle.

2. The apparatus of claim 1, wherein the medial portion of the central bar has a plurality of spaced apart through apertures, the apparatus further comprising a corresponding plurality of fasteners configured to extend through the respective through apertures to secure the central bar to the frame.

3. The apparatus of claim 2, wherein the fasteners are sized to threadingly engage a corresponding number of threaded apertures in the frame to secure the central bar to the frame.

4. The apparatus of claim 2, further comprising a backing plate configured to extend across and contactingly engage a lower surface of the frame and a lower surface of the central bar, the fasteners configured to threadingly engage opposing ends of the backing plate to secure the central bar to the frame using a clam-shell arrangement.

5. The apparatus of claim 1, further comprising a conformal elastomeric coating on the central bar and the first and second attachment plates configured to reduce damage to the motorcycle during attachment and use of the apparatus.

6. The apparatus of claim 1, wherein the central bar is configured to be mounted to the motorcycle so as to nominally extend in an orthogonal direction with respect to a longitudinal axis of the motorcycle.

7. The apparatus of claim 1, wherein each of the first and second attachment plates are characterized as an annular ring with a central aperture configured to accommodate the respective first and second straps.

8. The apparatus of claim 1, wherein the central bar has a pair of spaced apart through hole apertures sized to accommodate first and second threaded fasteners configured to threadingly engage respective spaced apart first and second frame members of the frame of the motorcycle disposed between a gas tank and a seat support area of the motorcycle.

9. The apparatus of claim 1, wherein the central bar has an overall length of at least about 36 inches.

10. The apparatus of claim 1, wherein the central bar is formed of tubular metal and the first and second attachment plates are formed of plate metal.

11. The apparatus of claim 1, further comprising six adjustable attachment straps, the apparatus configured such that two of the six adjustable attachment straps are configured to attach a lower portion of the first attachment plate to respective forward and rear locations along the base surface adjacent a respective front wheel of the motorcycle and a rear wheel of the motorcycle and adjacent a first side of the motorcycle, two of the six adjustable attachment straps are configured to attach a lower portion of the second attachment plate to respective forward and rear locations along the base surface adjacent a respective one of the front and rear wheels of the motorcycle adjacent an opposing second side of the motorcycle, and two of the six adjustable attachment straps are configured to attach upper portions of the respective first and second attachment plates to the handle bar portion on opposing sides of the front wheel of the motorcycle.

12. A tie down bracket assembly for securing a motorcycle to a base surface for transport of the motorcycle, the apparatus comprising:
   an elongated central bar with a plurality of through hole apertures sized to accommodate threaded fasteners to attach the central bar to a frame of the motorcycle at a medial location adjacent a center of gravity of the motorcycle;
   a first attachment plate coupled to a first end of the elongated central bar;
   a second attachment plate coupled to an opposing second end of the elongated central bar;
   a first pair of adjustable straps configured to interconnect the respective first attachment plate and the second attachment plate to opposing sides of a set of handlebars affixed to the frame of the motorcycle;

a second pair of adjustable straps configured to interconnect the respective first attachment plate and the second attachment plate to opposing sides of the base surface adjacent a front wheel of the motorcycle, the front wheel coupled to the set of handlebars; and a third pair of adjustable straps configured to interconnect the respective first attachment plate and the second attachment plate to opposing sides of the base surface adjacent a rear wheel of the motorcycle, the rear wheel coupled to the frame of the motorcycle.

13. The tie down bracket assembly of claim 12, wherein the central bar is configured to be mounted to the frame between a gas tank of the motorcycle and a seat support area of the frame.

14. The tie down bracket assembly of claim 12, wherein the central bar is elongated tubular metal or a solid metal bar, wherein each of the first and second attachment plates are substantially triangular in shape with three corner areas and three sides, and wherein the central bar is attached to a selected one of the sides along an edge of each of the first and second attachment plates between a pair of the corner areas.

15. The tie down bracket assembly of claim 12, wherein each of the first and second attachment plates has a plurality of spaced apart through apertures.

16. The tie down bracket assembly of claim 12, wherein each of the first and second attachment plates is substantially triangular in configuration.

17. The tie down bracket assembly of claim 12, wherein each of the first and second attachment plates has a substantially triangular configuration with an upper corner, a first lower corner nearest the front wheel of the motorcycle and a first rear corner nearest the rear wheel of the motorcycle once the tie down bracket assembly is coupled to the motorcycle, wherein a first aperture extends through each of the first and second attachment plates adjacent the upper corner of each of the first and second attachment plates, wherein a second aperture extends through each of the first and second attachment plates adjacent the first lower corner of each of the first and second attachment plates, and wherein a third aperture extends through each of the first and second attachment plates adjacent the first rear corner of each of the first and second attachment plates.

18. An apparatus for securing, to a base surface, a motorcycle having a frame and a handle bar portion, the apparatus comprising:

a central bar having opposing proximal and distal ends and a medial portion between the proximal and distal ends configured for attachment to the frame at a medial location of the motorcycle;

a first attachment plate attached to the proximal end of the central bar;

a second attachment plate attached to the distal end of the central bar, each of the first and second attachment plates configured to receivingly engage at least a first strap for securement to the base surface and at least a second strap for securement to the handle bar portion of the motorcycle; and six adjustable attachment straps arrangeable such that two of the six adjustable attachment straps are configured to attach a lower portion of the first attachment plate to respective forward and rear locations along the base surface adjacent a respective front wheel of the motorcycle and a rear wheel of the motorcycle and adjacent a first side of the motorcycle, two of the six adjustable attachment straps are configured to attach a lower portion of the second attachment plate to respective forward and rear locations along the base surface adjacent the respective front and rear wheels of the motorcycle adjacent an opposing second side of the motorcycle, and two of the six adjustable attachment straps are configured to attach upper portions of the respective first and second attachment plates to the handle bar portion on opposing sides of the front wheel of the motorcycle.

19. The apparatus of claim 18, wherein each of the first and second attachment plates is characterized as an annular ring with a central opening extending therethrough.

20. The apparatus of claim 18, wherein each of the first and second attachment plates is characterized as a triangular plate with at least three spaced apart through-hole apertures extending therethrough.

* * * * *